United States Patent
Cao et al.

(10) Patent No.: US 11,157,161 B2
(45) Date of Patent: Oct. 26, 2021

(54) USING PRESSURE SENSOR DATA IN A REMOTE ACCESS ENVIRONMENT

(71) Applicant: Citrix Systems, Inc., Fort Lauderdale, FL (US)

(72) Inventors: Lei Cao, Nanjing (CN); Tao Yin, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 140 days.

(21) Appl. No.: 15/890,975

(22) Filed: Feb. 7, 2018

(65) Prior Publication Data

US 2019/0243520 A1    Aug. 8, 2019

(51) Int. Cl.
| | |
|---|---|
| *G06F 3/0487* | (2013.01) |
| *G06F 3/0481* | (2013.01) |
| *G06F 9/455* | (2018.01) |
| *G06F 9/451* | (2018.01) |

(52) U.S. Cl.
CPC .......... *G06F 3/0487* (2013.01); *G06F 3/0481* (2013.01); *G06F 9/452* (2018.02); *G06F 9/45558* (2013.01); *G06F 9/45533* (2013.01); *G06F 2203/04808* (2013.01)

(58) Field of Classification Search
CPC .. G06F 3/0487; G06F 3/0481; G06F 9/45558; G06F 2203/04808
See application file for complete search history.

(56) References Cited

U.S. PATENT DOCUMENTS

| | | | |
|---|---|---|---|
| 5,826,027 A | 10/1998 | Pedersen et al. | |
| 6,633,282 B1* | 10/2003 | Monroe | G06F 3/03545 178/19.03 |
| 2005/0026643 A1* | 2/2005 | White | B23Q 1/0009 455/550.1 |
| 2012/0092277 A1* | 4/2012 | Momchilov | G06F 3/038 345/173 |
| 2013/0132856 A1* | 5/2013 | Binyamin | G06F 3/017 715/740 |
| 2013/0307788 A1* | 11/2013 | Rao | G06F 3/0488 345/173 |
| 2014/0157209 A1* | 6/2014 | Dalal | G06F 3/017 715/863 |
| 2014/0344766 A1* | 11/2014 | Cao | G06F 3/017 715/863 |

(Continued)

*Primary Examiner* — Andrew T Chiusano
(74) *Attorney, Agent, or Firm* — Banner & Witcoff, Ltd.

(57) ABSTRACT

Described herein are methods and systems that use pressure sensor data as a basis for performing one or more operations in a remote access environment. For example, a device may be configured with one or more pressure sensors that, based on a user's press, may generate pressure sensor data indicating an amount of force being applied by the user's press. The pressure sensor data may be used, in accordance with the various embodiments and variations described herein, to cause one or more operations to be performed by an enterprise resource or an enterprise service. In some embodiments, the one or more operations may be performed by an application or an operating system executing in the remote access environment. Some non-limiting examples of the types of operations that may be performed include a change to a font characteristic and a change to a text characteristic.

22 Claims, 11 Drawing Sheets

(56) References Cited

U.S. PATENT DOCUMENTS

2016/0357368 A1* 12/2016 Federighi ............ G06F 3/04842
2017/0199653 A1*  7/2017 Rajasankar ......... G06F 3/04845
2019/0310723 A1* 10/2019 Kang ...................... G06F 3/041

* cited by examiner

USING PRESSURE SENSOR DATA IN A REMOTE ACCESS ENVIRONMENT

FIELD

Aspects described herein generally relate to remote access environments, hosted resources and pressure sensor data received at a client device.

BACKGROUND

An increasing number of devices are pressure-sensitive. For example, FORCE TOUCH by APPLE, INC., allows devices to distinguish between different levels of force being applied to a touch screen or a touch pad. Other devices use different pressure-sensitive frameworks such as DIRECTINK by MICROSOFT CORPORATION and 3D TOUCH by APPLE, INC. As pressure-sensitive devices become more common, users get more used to interacting with their devices using the pressure-sensitive functionality.

The user experience of a remote access environment, such as one that hosts one or more applications on behalf of a client device, can be enriched if users are able to interact with a hosted application in the same way as they interact with a local application. Providing pressure-sensitive functionality in a remote access environment, however, presents a number of challenges. The hosted applications may not natively support pressure-sensitive functionality. Further, the client device may not be configured to transmit the pressure sensor data to the remote access environment.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present specification, aspects described herein are directed towards using pressure sensor data as a basis for performing one or more operations in a remote access environment.

For example, various aspects described herein relate to a method that includes receiving, by one or more computing devices of a remote access environment that is hosting an application on behalf of a client device, pressure sensor data that indicates an amount of pressure being applied by a user's press on one or more pressure sensors of the client device. The method further includes, based on determining whether the pressure sensor data is associated with an application or an operating system, causing, by the one or more computing devices, the application or the operating system to perform, based on the pressure sensor data, one or more operations. The method further includes, transmitting, by the one or more computing devices and to the client device, data indicating that the one or more operations were performed.

Further aspects relate to systems and apparatuses that implement the above method, and other variations. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards using pressure sensor data as a basis for performing one or more operations in a remote access environment. For example, a device may be configured with one or more pressure sensors that, based on a user's press, may generate pressure sensor data indicating an amount of force being applied by the user's press. This amount of force being applied by the user's press could also be referred to as a magnitude of force being applied by the user's press. The pressure sensor data may be used, in accordance with the various embodiments and variations described herein, to cause one or more operations to be performed by an application or an operating system executing in the remote access environment. Various types of operations may be performed. For example, based on the pressure sensor data, a characteristic of a font may be changed (e.g., the font size may be increased), a characteristic of text may be changed (e.g., an option for bolding text may be turned on), and/or the active application for a remote desktop session may be switched. These and other types of operations will be discussed in greater detail below.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
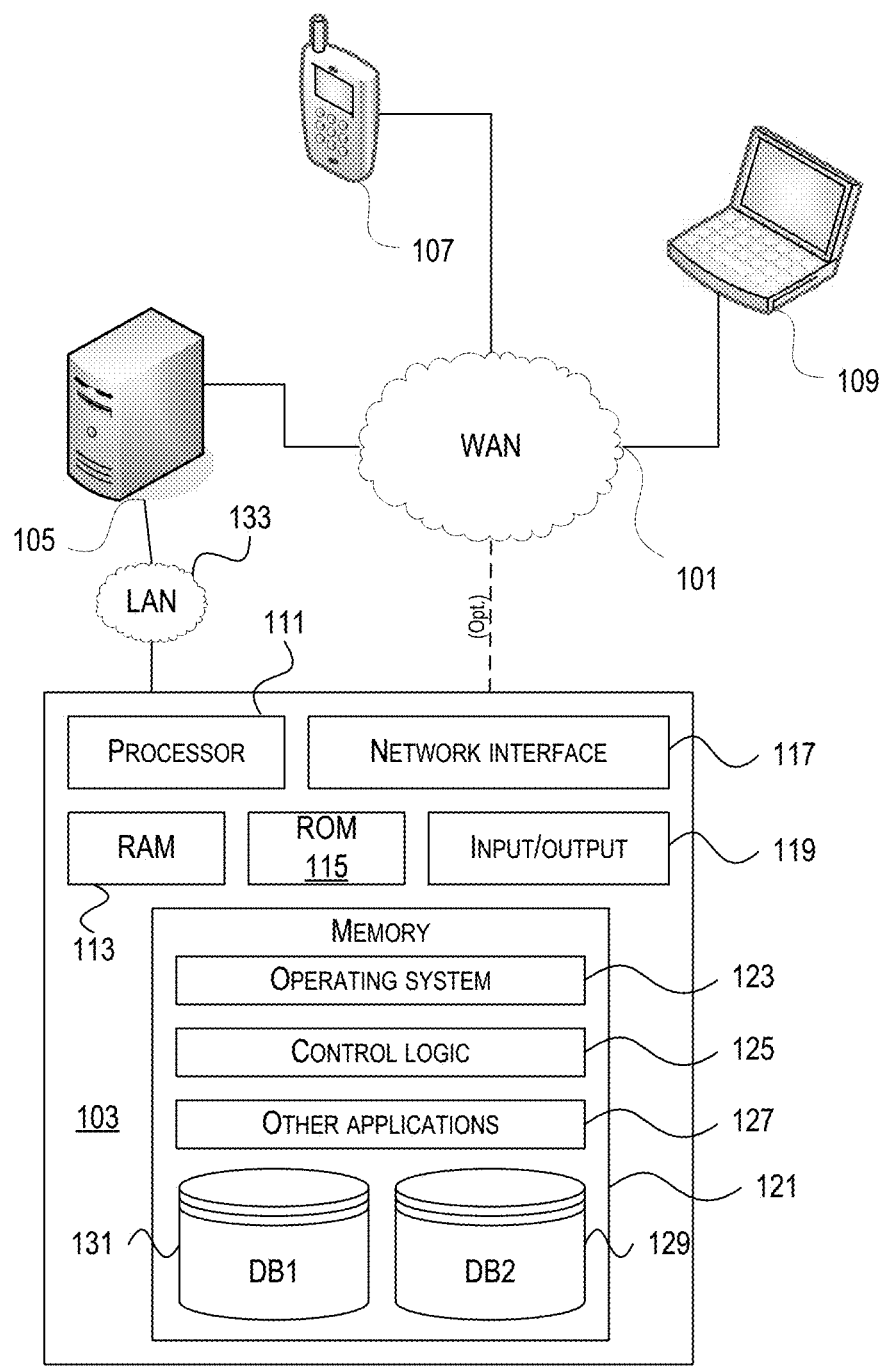
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
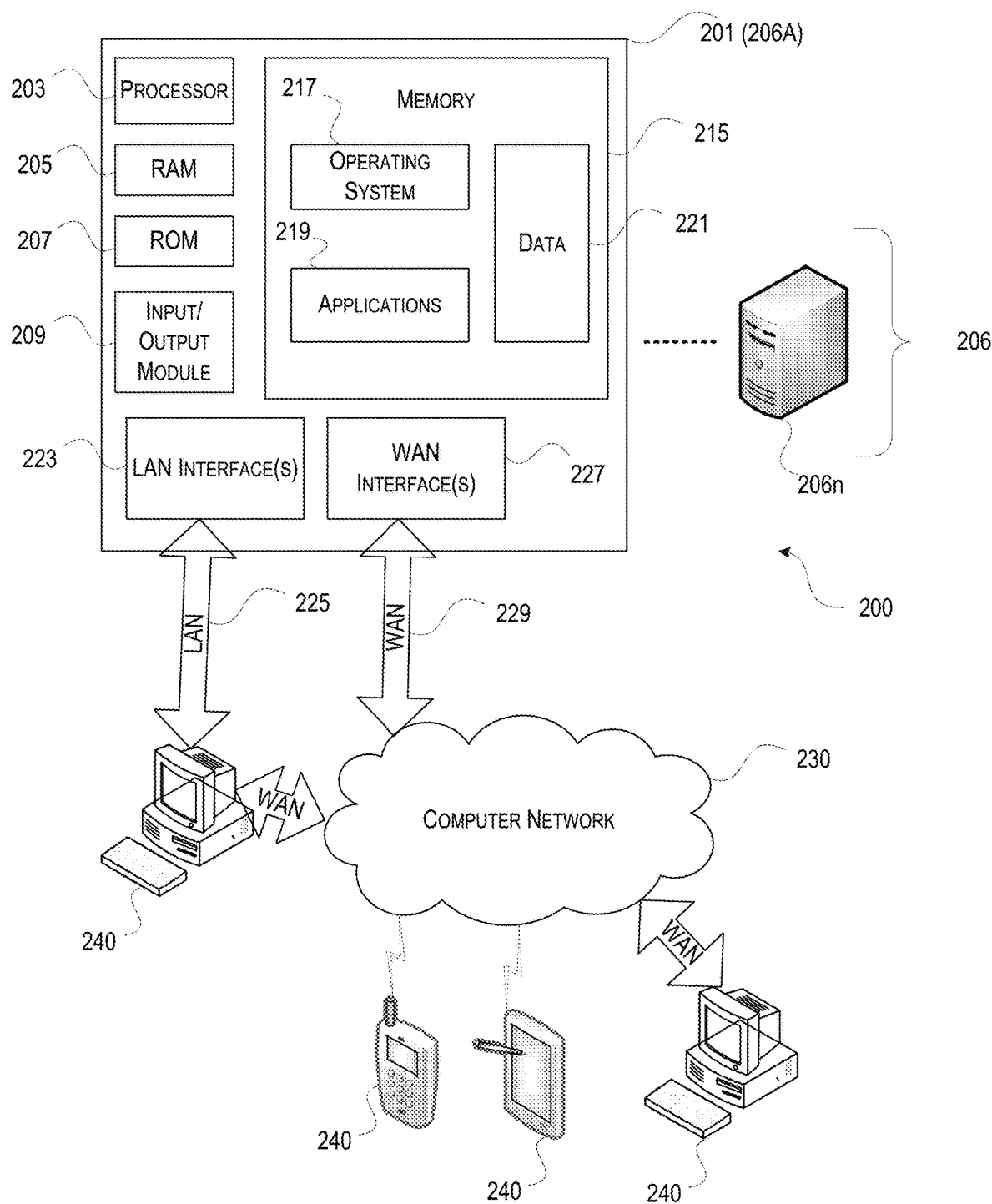
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
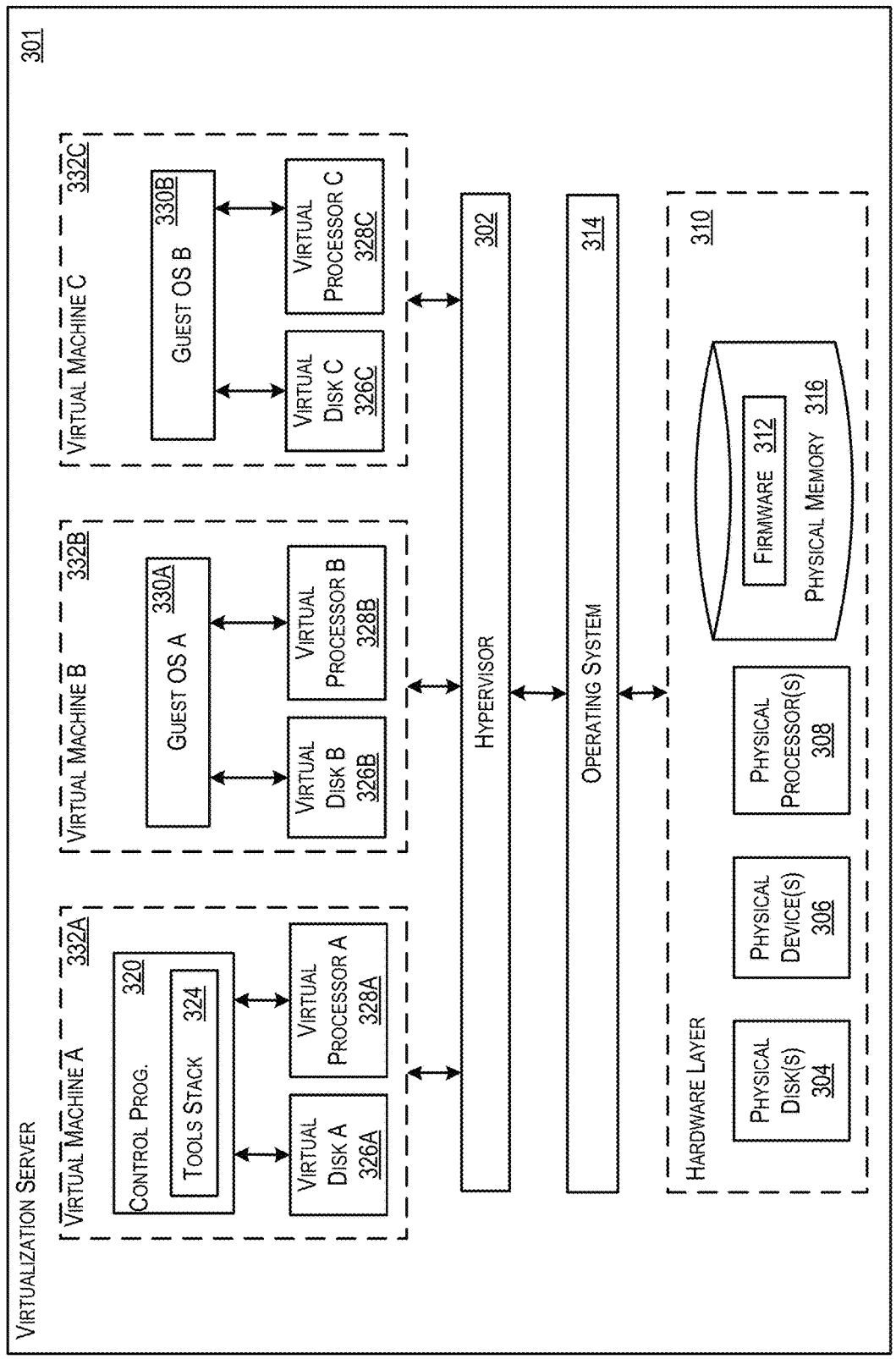
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e g, many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
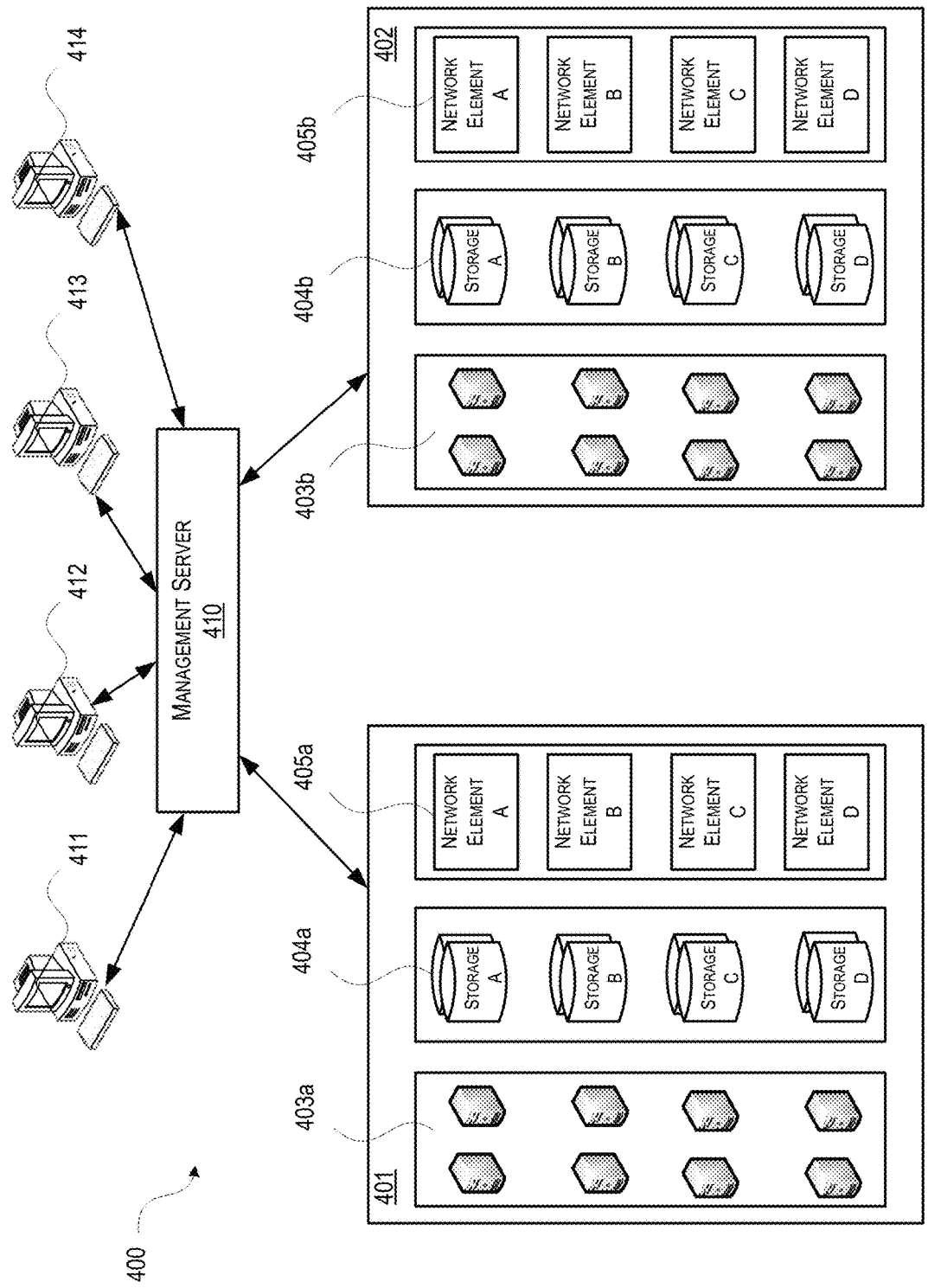
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
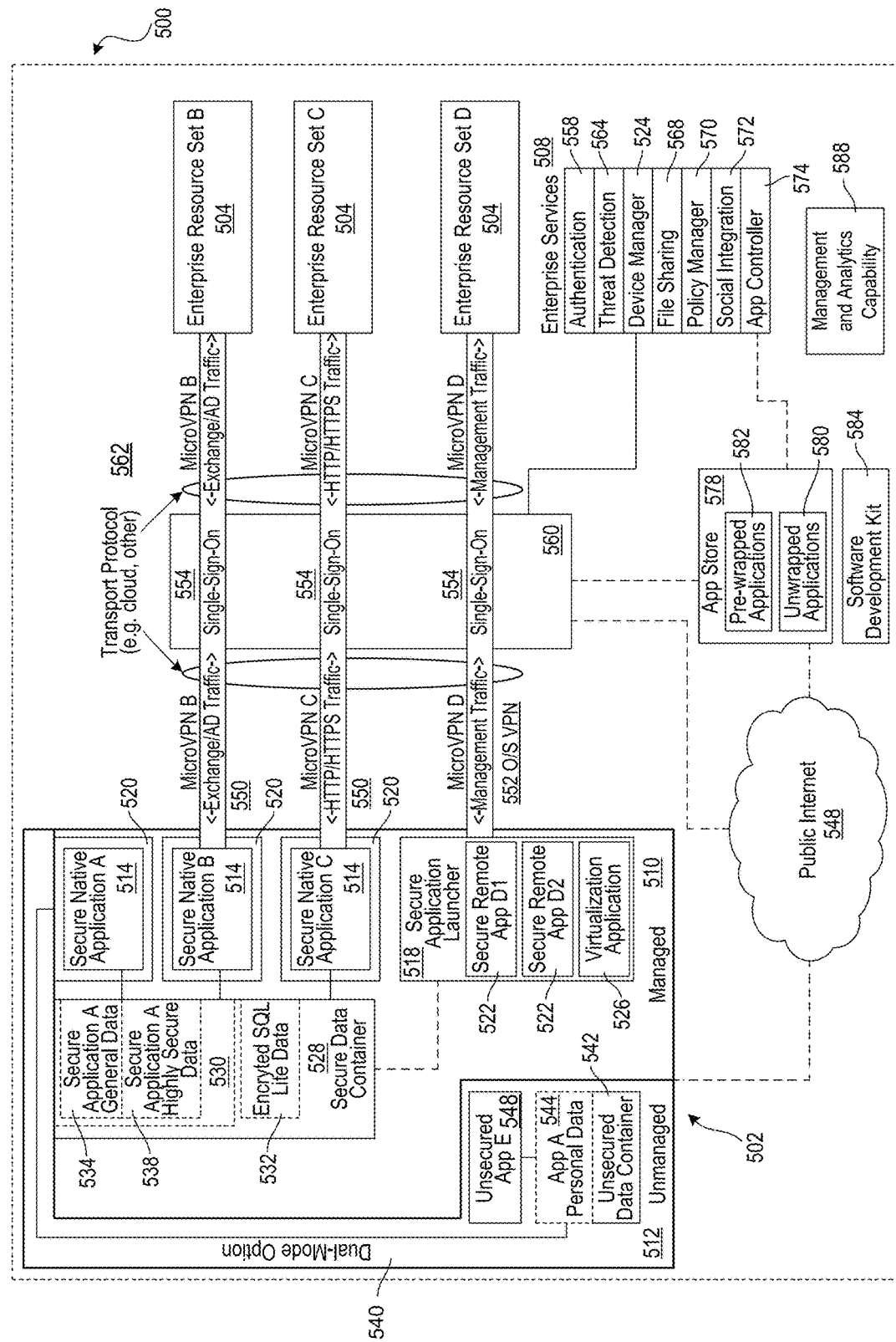
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
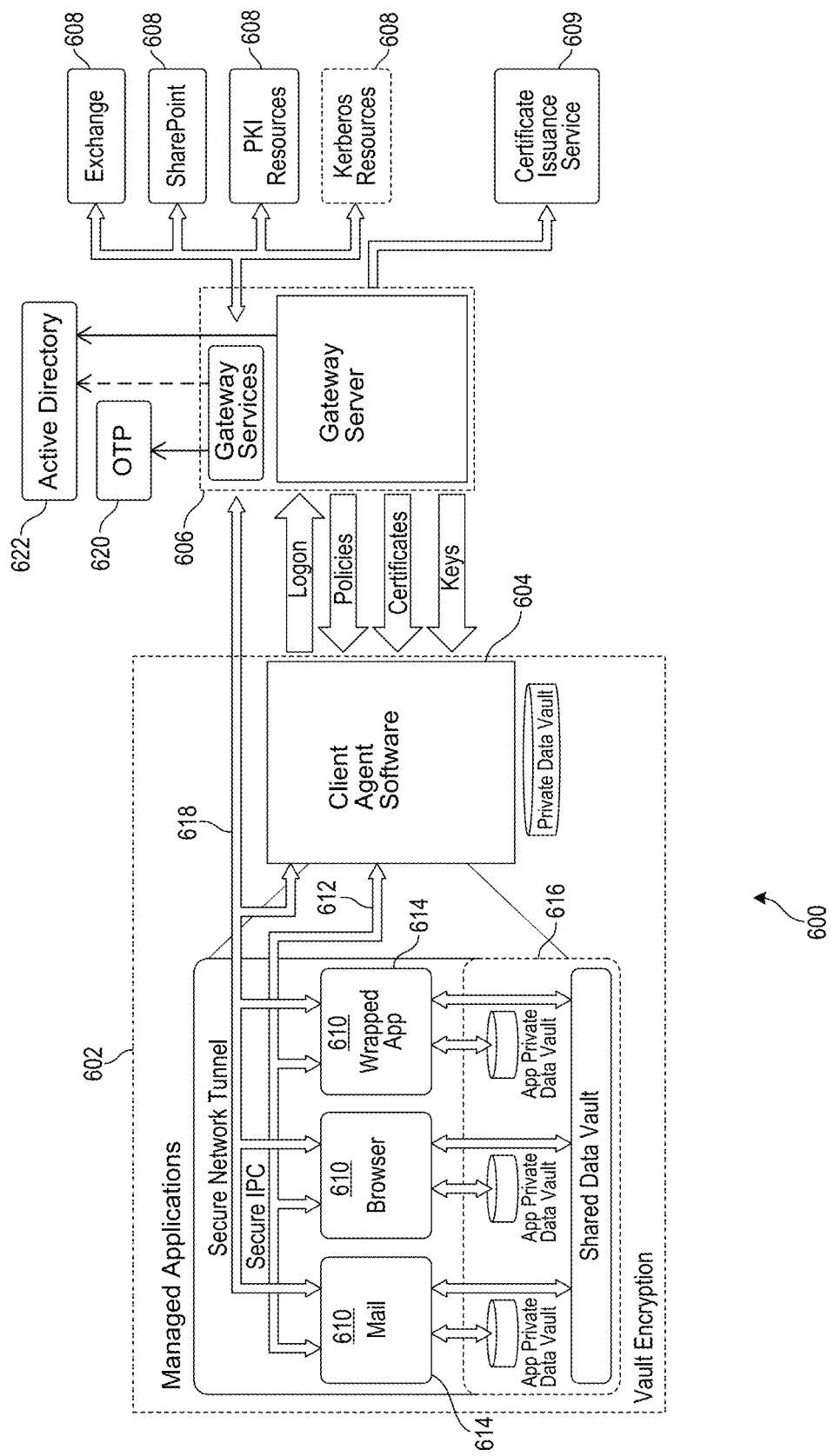
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Pressure Sensor Data

As discussed above, aspects described herein are directed towards using pressure sensor data as a basis for performing one or more operations in a remote access environment. The remote access environment was introduced above in connection with FIGS. 1-6. The remaining figures, FIGS. 7-11, will discuss various ways in which the remote access environment of FIGS. 1-6 can be implemented such that pressure sensor data is used as a basis for performing one or more operations on the enterprise resources and enterprise services of FIGS. 1-6 (e.g., enterprise resources 504 and enterprise services 508). For brevity the examples provided throughout FIGS. 7-11 will be described in terms of an enterprise resource.

Figure 7:
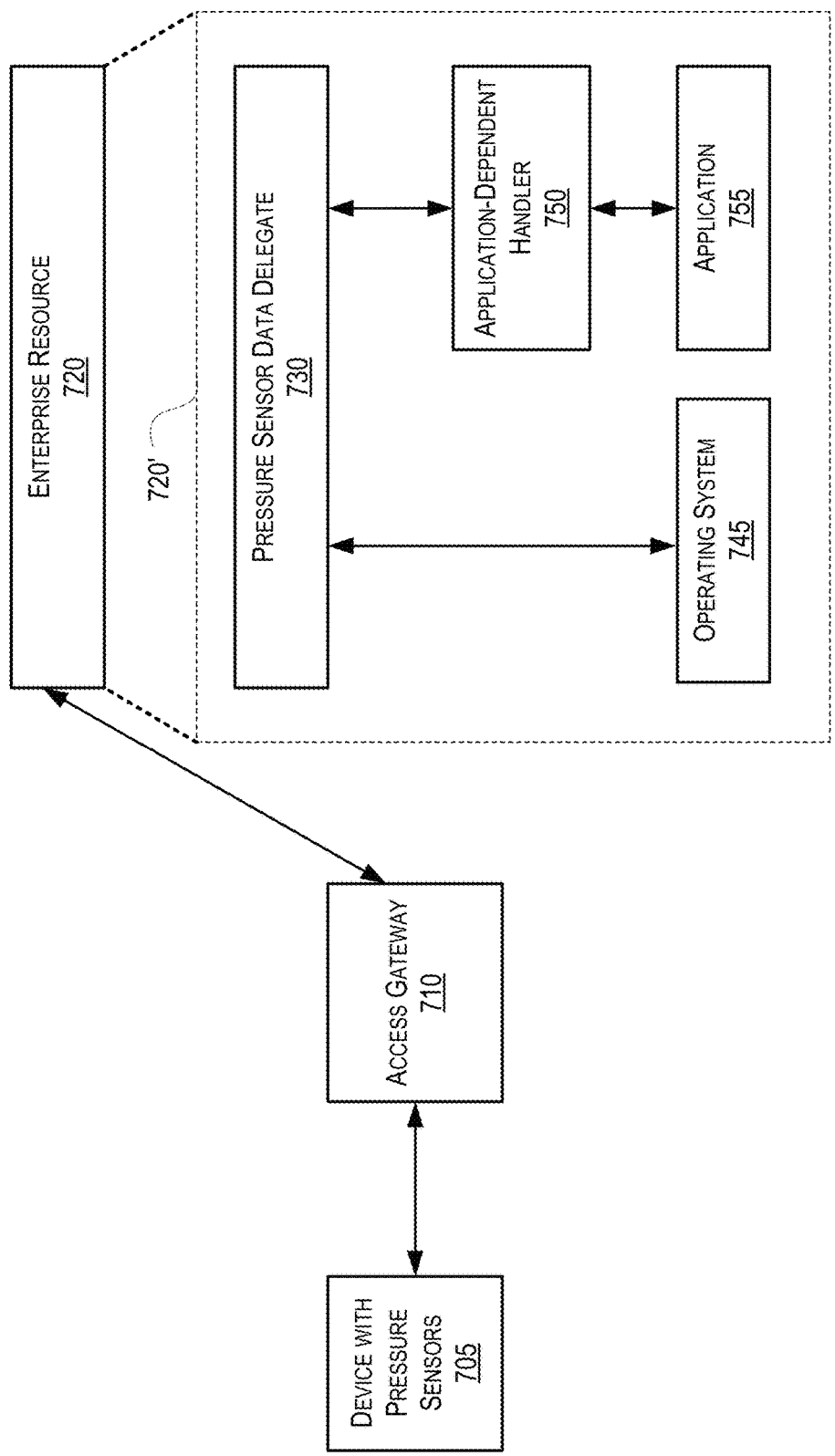
FIG. 7 depicts an example generalized block diagram for using pressure sensor data in a remote access environment.

FIG. 7 depicts an example generalized block diagram for using pressure sensor data in a remote access environment. As depicted in FIG. 7, a device 705 is in communication with an access gateway 710. The access gateway 710 may be in communication with one or more enterprise resources, such as enterprise resource 720. The device 705 may be one of the client devices discussed in connection with FIGS. 1-6 (e.g., devices 107, 109, 240, 502 and/or 602). The access gateway may be one of the gateway devices discussed in connection with FIGS. 1-6 (e.g., gateway devices 206, 560, and/or 606). The enterprise resource 720 may be one of the resources discussed in connection with FIGS. 1-6 (e.g., enterprise resource 504 and/or 608). Additional details associated with the enterprise resource 720 are depicted within detail box 720', which includes pressure sensor data delegate 730, operating system 745, application-dependent handler 750, and application 755.

Device 705 may be configured with, or otherwise include, one or more pressure sensors. In some variations, device 705 may include a pressure-sensitive touch screen and, based on a user's press on the touch screen, the one or more pressure sensors may generate pressure sensor data. In other variations, device 705 may include a pressure-sensitive touch pad and, based on a user's press on the touch pad, the one or more pressure sensors may generate pressure sensor data. After receiving and/or processing the pressure sensor data, the device 705 may transmit the pressure sensor data to the access gateway 710. Irrespective of the exact manner in which the pressure sensor data is generated by or received from the one or more pressure sensors, the pressure sensor data may indicate an amount of force being applied by the user's press. In some variations, the pressure sensor data may be transmitted to the access gateway 710 via a secure tunnel (e.g. microVPN 550, microVPN 552, and/or network tunnel 618). The pressure sensor data may be transmitted in accordance with a particular protocol, such as ICA or RDP. Further, the pressure sensor data may be transmitted in its own virtual channel (e.g., an ICA virtual channel dedicated to sending the pressure sensor data between the device 705 and the access gateway 710).

Upon receipt by the access gateway 710, the pressure sensor data may be forwarded to enterprise resource 720. In some embodiments, the enterprise resource 720 may be configured to process pressure sensor data for the remote access environment or may be configured to manage the remote access of the device 705. For example, the remote access environment may include multiple enterprise resources for processing pressure sensor data that is received from multiple client devices, and each enterprise resource may be established to process the pressure sensor data of a particular client device. In this manner, the access gateway 710 may, determine which enterprise resource (e.g., enterprise resource 720) is for processing the pressure sensor data of the device 705, and transmit the pressure sensor data to the determined enterprise resource. As another example, the remote access environment may include an enterprise resource that manages the remote access of each client device (e.g., enterprise resource 720 may be configured to manage a remote desktop session for the device 705). In this manner, the access gateway may, based on device 705 being the source of the pressure sensor data, transmit the pressure sensor data to the corresponding enterprise resource.

Upon receipt by the enterprise resource 720, the pressure sensor data may be processed as part of a process for causing performance of one or more operations. Various types of operations may be performed including, for example, an operation to change a characteristic of a font (e.g., an operation to increase a font size); an operation to change a characteristic of text (e.g., an operation to bold text); and an operation to switch which application is currently active in a remote desktop session (e.g., an operation to change from a word processing application and to a browser application). The various types of operations that can be performed may depend on the application being executed (e.g., a drawing application may support different operations from a word processing application), the interface options of the operating system (e.g., a WINDOWS operating system may support different operations from a LINUX operating system), and/or any additional functionality implemented by the enterprise (e.g., the enterprise may implement additional operations to extend the set of supported operations defined by an application and/or an operating system).

The processing of the pressure sensor data is depicted in FIG. 7 by detail box 730. The pressure sensor data may be processed by a pressure sensor data delegate 730 and an application-dependent handler 750. The application-dependent handler may be configured to act as an interface between the pressure sensor data delegate 730 and the application 755, or otherwise assist the pressure sensor data delegate 730 in causing the application 755 to perform an operation. In some embodiments, the pressure sensor data delegate 730 may be a software process executing within a virtual machine. In some embodiments, the application-dependent handler 750 may be a plug-in for the application 755 or a software process executing within a virtual machine.

As part of the process for causing an operation to be performed, the pressure sensor data delegate 730 and/or the application-dependent handler 750 may determine which operations are to be performed based on the pressure sensor data. This determination may, in some instances, include determining one or more application programming interface (API) calls associated with the operating system 745 and/or the application 755. The API call may be used to cause performance of the operation (e.g., change a font to bold, etc.). Further, the specific API call that is included in the one or more operations may be based on the pressure sensor data and other data associated with the remote access of the device 705 (e.g., a current position of a pointer, an indication of what application is currently active, and the like). Additionally, in some instances, to cause performance of the operation, the pressure sensor data may be transmitted to the application 755 and/or the operating system 745. For example, the operating system 745 and/or the application 755 may support the processing of pressure sensor data (e.g., WINDOWS 10 and the DIRECTINK functionality). In such instances where the operating system 745 and/or the application 755 supports the processing of pressure sensor data, the pressure sensor data delegate 730 and/or the application-dependent handler 750 may transmit the pressure sensor data to the operating system 745 and/or the application 755 to cause the operation to be performed.

As part of the process for causing performance of an operation, the pressure sensor data delegate 730 may be configured to determine whether the pressure sensor data is associated with a particular application or an operating system. If the pressure sensor data is associated with a particular application, the force touch delegate 730 may determine which application-dependent handler is associated with the particular application and may transmit data (e.g., the pressure sensor data and/or one or more API calls) to that application-dependent handler. Upon receipt, the application-dependent handler (e.g., handler 750) may process the transmitted data and cause performance of the operation. If the pressure sensor data is associated with an operating system, the force touch delegate 730 may transmit data (e.g., the pressure sensor data and/or one or more API calls) to the operating system 745 to cause performance of the operation. Further details as to how the force touch delegate may be configured to determine whether the pressure sensor data is associated with a particular application or an operating system will be discussed in connection with FIG. 9.

Further, to assist the pressure sensor data delegate 730 in causing performance of an operation, the enterprise resource 720 may include one or more application-dependent handlers. For example, in some arrangements, the enterprise resource 720 may include an application-dependent handler for each application that is to support performing operations based on pressure sensor data (e.g., a word processing application may be associated with application-dependent handler 750, and a drawing application may be associated with a handler different from application-dependent handler 750). FIG. 7 illustrates one such application-dependent handler at 750.

Additionally, in some variations, the force touch delegate 730 may be configured to transmit data directly to an application (not shown in FIG. 7). For example, if an application supports the processing of pressure sensitive data, the force touch delegate 730 may transmit the pressure sensor data directly to the application to cause performance of the operation.

After the operation is performed, the enterprise resource 720 may generate enterprise resource data that indicates an operation was performed based on the pressure sensor data. For example, if the operation was to turn a font into bold, the enterprise resource data may include an image of a user interface that indicates that bolding is active (e.g., an icon for 'bold' is highlighted). As another example, if the operation was to increase a font size, the enterprise resource data may include an image of a user interface that indicates an increased font size (e.g., a font size selector is updated to indicate a size of 14). As yet another example, if the operation was to change the active application for a remote desktop session, the enterprise resource data may include an image of a user interface with a window of the new active application. The enterprise resource data may be transmitted to the device (e.g., via a secure tunnel between access gateway 710 and the device 705). This may be performed responsive to completing the operation, or may be performed as part of the normal remote access processing for the device 705 (e.g., enterprise resource data may be periodically transmitted to the device 705 to indicate the current status of the remote access).

Figure 8:
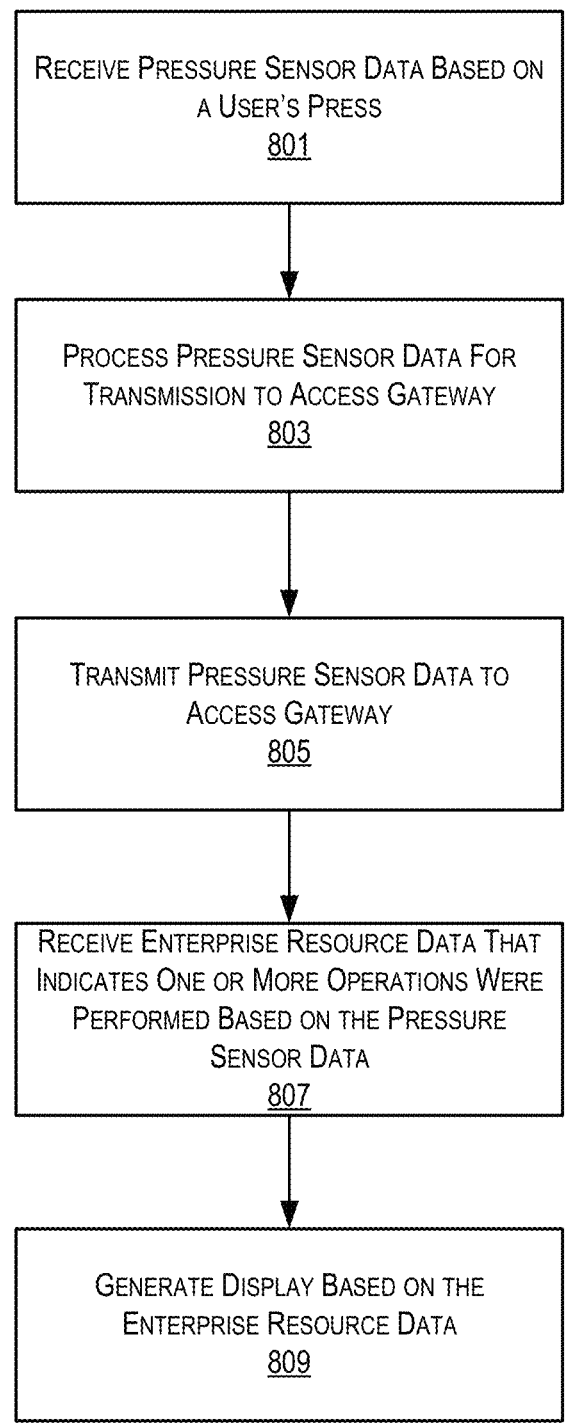
FIG. 8 depicts an example method for processing pressure sensor data and enterprise resource data by a client device in communication with a remote access environment.

FIG. 8 depicts an example method for processing pressure sensor data and enterprise resource data by a client device in communication with a remote access environment. In some embodiments, the method of FIG. 8 may be performed by device 705.

At step 801, the client device may receive pressure sensor data based on a user's press. For example, the user may be pressing on a pressure-sensitive touch screen and/or a pressure-sensitive touch pad. Based on the user's press, one or more pressure sensors may generate the pressure sensor data and forward the pressure sensor data for further processing by the client device. The pressure sensor data may indicate an amount of force being applied by the user's press. In one or more arrangements in accordance with the depictions of FIGS. 5-7, a client agent that is executing on the client device and managing the client device's remote access with the remote access environment may receive the pressure sensor data for further processing.

At step 803, the client device may process the pressure sensor data for transmission to an access gateway associated with the remote access environment. The processing of step 803 may be performed by the client agent. Processing the pressure sensor data may include formatting the pressure sensor data according to ICA or RDP, and/or encrypting the pressure sensor data. Additionally or alternatively, processing the pressure sensor data may include generating data for transmission (e.g., one or more packets of data). The data for transmission may include the pressure sensor data and additional data associated with the client device. For example, the additional data may include an indication of a location for the user's press (e.g., a coordinate indicating where the user is pressing on the one or more pressure sensors), an indication of a state for the user's press (e.g., an indication that the data is for a beginning state of a user's press; an indication that the data is an update to a user's continued press; or an indication that the data is for an end to a user's press); an indication of a timestamp associated with the pressure sensor data (e.g., a timestamp indicating when the pressure sensor data was generated and/or indicating when the performed the press); and other configuration data associated with the client device, the one or more pressure sensors, and/or the mobility management framework.

At step 805, the client device may transmit the pressure sensor data to the access gateway. For example, the pressure sensor data may be transmitted via a secure tunnel to the access gateway. The secure tunnel may be any of the microVPNs or secure tunnels discussed above in connection with FIGS. 5-7. Further, the pressure sensor data may be transmitted, via the secure tunnel, using a channel dedicated to pressure sensor data.

At step 807, the client device may receive, from the access gateway, enterprise resource data that indicates one or more operations were performed based on the pressure sensor data. The enterprise resource data may indicate the performance of the one or more operations via graphical data, such as a screenshot of a remote desktop or a user interface of an application. The form of the enterprise resource data may be based on the manner in which the client agent and the remote access environment are configured to communicate updates.

Step 807 may be performed after the remote access environment processes the pressure sensor data and performs one or more operations based on the pressure sensor data. The processes of the remote access environment are described in connection with FIG. 9.

Figure 10:
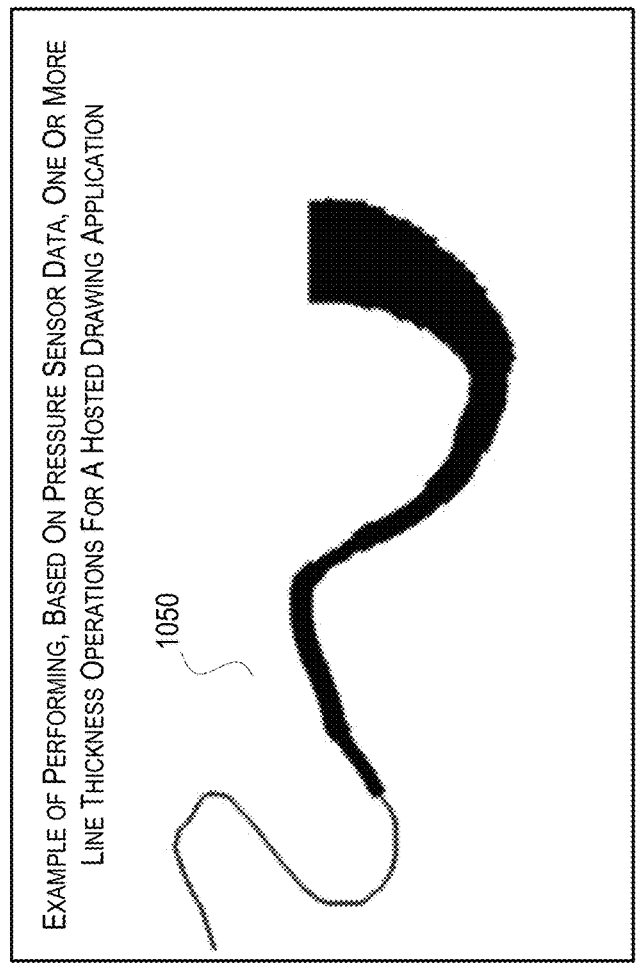
FIG. 10 illustrates example display screens for comparing operations performed by an enterprise resource or an enterprise service.
Figure 10:
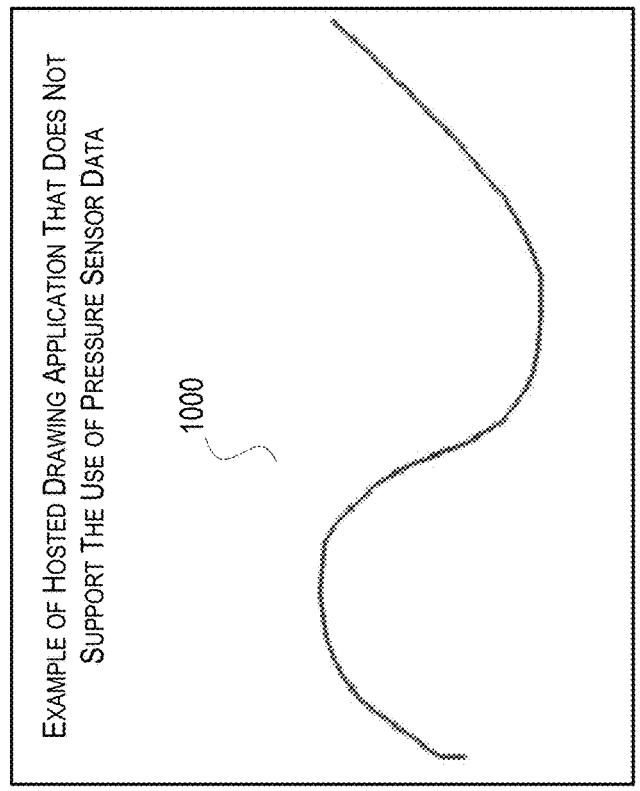

At step 809, the client device may generate a display based on the enterprise resource data. For example, if the operation was to turn a font into bold, the display may include an image of a user interface that indicates that bolding is active (e.g., an icon for 'bold' is highlighted). As another example, if the operation was to increase a font size, the display may include an image of a user interface that indicates an increased font size (e.g., a font size selector is updated to indicate a size of 14). As yet another example, if the operation was to change the active application for a remote desktop session, the display may include an image of a user interface with window of the new active application. FIG. 10 illustrates another example display for a drawing application.

While the above is discussed in terms of generating a display screen that graphically indicates the operation was performed, other types of indications are possible. For example, the indication could be audible. Indeed, a piano-playing application may allow for a user to play notes at varying volumes based on the amount of pressure applied by the user's press. The enterprise resource data may cause the client device to generate audio in accordance with the varying volumes.

Figure 9:
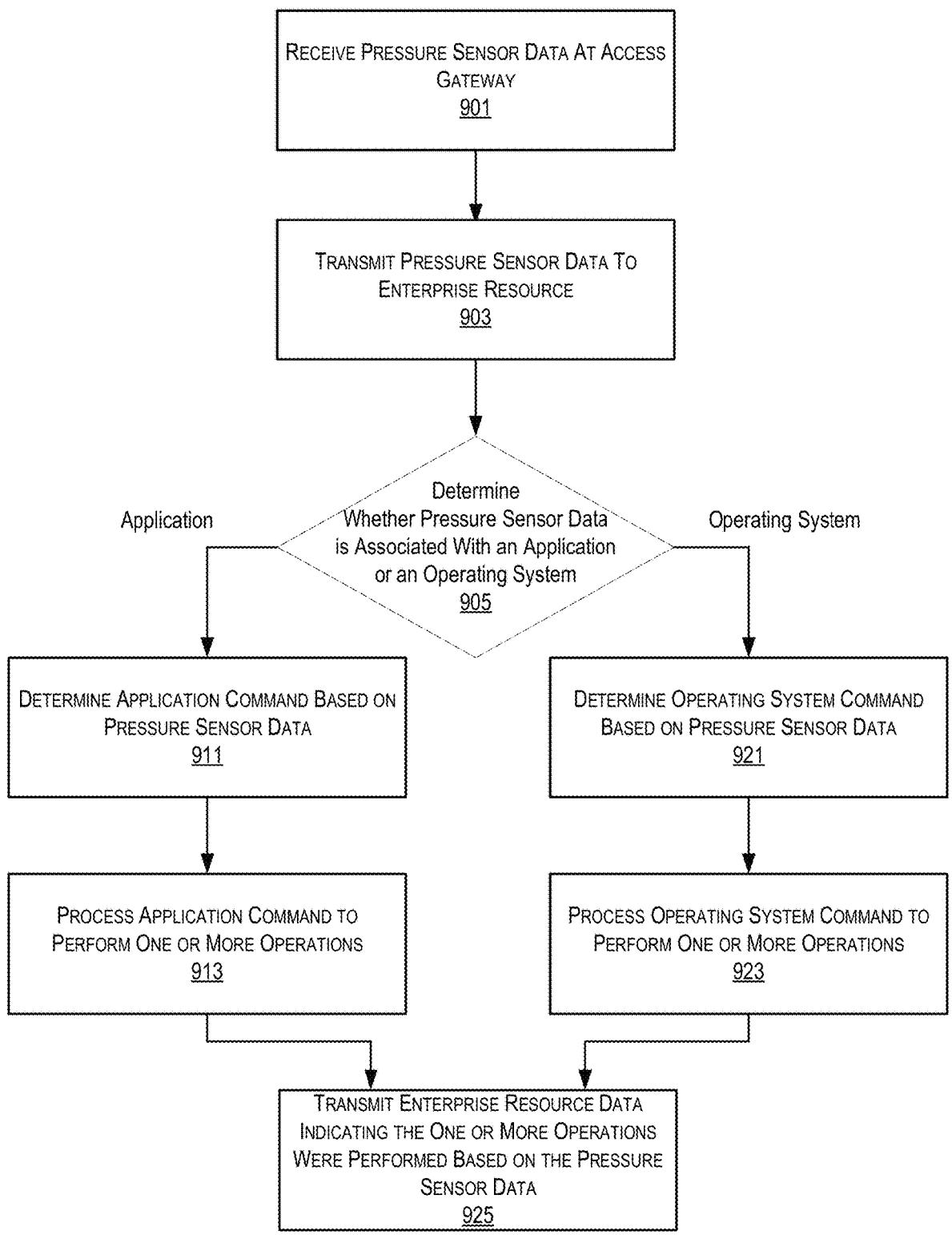
FIG. 9 depicts an example method for processing pressure sensor data and enterprise resource data by one or more computing devices of a remote access environment

FIG. 9 depicts an example method for processing pressure sensor data and enterprise resource data by one or more computing devices of a remote access environment. In some embodiments, various portions of the method of FIG. 9 may be performed by access gateway 710 and enterprise resource 720. Thus, the method of FIG. 9 may be performed by one or more computing devices of the remote access environment.

At step 901, the access gateway may receive pressure sensor data via a secure tunnel from the client device. Upon receiving the pressure sensor data, the access gateway may process the pressure sensor data such as by extracting the pressure sensor data from the transport communication and/or decrypting the pressure sensor data.

At step 903, the access gateway may transmit the pressure sensor data to an enterprise resource for processing. The access gateway may perform the transmission based on a load-balancing algorithm that selects the enterprise resource from a set of available resources that process pressure sensor data. Alternatively, the access gateway may perform the transmission based on determining which enterprise resource corresponds to the client device (e.g., which enterprise resource is configured to manage the remote access for the client device).

At step 905, the one or more computing devices of the remote access environment may determine whether the pressure sensor data is associated with an application or an operating system. Based on determining whether the pressure sensor data is associated with an application or an operating system, the one or more computing devices may proceed to cause the application or the operating system to perform, based on the pressure sensor data, one or more operations. For examples, steps 911 and 913 illustrate an example where the application is caused to perform the one or more operations. Steps 921 and 923 illustrate an example where the operating system is caused to perform the one or more operations. Thus, if the one or more computing devices determines that the pressure sensor data is associated with an application, the method may proceed to step 911. If the one or more computing devices determines that the pressure sensor data is associated with an operating system, the method may proceed to step 921.

The determination at step 905 may be performed in various ways including, for example, an application-dependent process, a press characteristic-based process or a combination of the application-dependent and press characteristic-based processes. As will be illustrated by the examples throughout this disclosure, the application-dependent process may allow for an operation to be performed that is configured specifically for the currently active application. For example, if a word processing application is currently active and the user presses with a threshold amount of force, a font may increase in size. However, if a drawing application was currently active instead of the word processing application, that same press may have caused a thickness of a drawn line to increase. Additionally, as will be illustrated by the examples throughout this disclosure, the press characteristic-based process may allow for an operation to be performed that is configured specifically for a user's press. For example, if a user presses at a threshold amount of force for a first threshold amount of time (e.g., 3 seconds), the currently active application may change to a different application. However, if the user presses at the threshold amount of force for a second threshold amount of time (e.g., 5 seconds), the applications may be minimized and a desktop view may be shown.

In some embodiments using an application-dependent process, the one or more computing devices may perform the determination at step 905 by analyzing configuration data associated with the client device to identify whether the an application-dependent mode is active or inactive. If the application-dependent mode is active, the one or more computing devices may proceed by determining the currently active application for the remote access session (e.g., determine whether a word processing application, a drawing application, or no application is currently active) and analyzing configuration data to identify a listing of applications that are configured within the remote access environment to support pressure-sensitive functionality for the client device. The listing may include entries for one or more applications that natively support pressure-sensitive functionality (e.g., DIRECTINK) and/or one or more applications that support pressure-sensitive functionality based on an associated application-dependent handler (e.g., application-dependent handler 750). In some arrangements, an application-dependent handler may be configured for and associated with an application that does not natively support pressure-sensitive functionality. The one or more computing devices may compare the applications from the listing with the currently active application. If an entry on the listing matches the currently active application, the one or more computing devices may determine that the pressure sensor data is associated with an application and, therefore, may proceed to step 911. If none of the entries match the currently active application, the one or more computing devices may determine that the pressure sensor data is associated with an operating system and, therefore, may proceed to step 921.

In some embodiments using a press characteristic-based process, the one or more computing devices may perform the determination at step 905 by determining characteristics of the user's current press. The characteristics may be determined based on a time-window (e.g., any press within the last 2 seconds) and/or based on a user's continuous press. The one or more computing devices may also analyze configuration data associated with the client device to identify a listing of press characteristic combinations. These combinations may include entries for combinations of, for example, time thresholds (e.g., 1, 3 or 5 seconds), pressure amount thresholds (e.g., 33% of maximum pressure; 66% of maximum pressure), one or more location or area indications (e.g., one or more coordinates that indicate an expected press location or area; or one or more coordinate ranges that indicate an expected press location or area); and/or one or more gesture definitions (e.g., swipe right, swipe left, swipe up, or swipe down). The characteristics of the user's current press may be compared to the combinations. If one or more of the listed combinations is satisfied by the characteristics of the user's current press, the one or more computing devices may then determine whether the satisfied combination is associated with an application or an operating system. Dependent on whether the satisfied combination is associated with an application or an operating system, the method may proceed to step 911 or step 921. For example, if the current user has been pressing at 50% of the maximum pressure for 3 seconds, and one of the combinations requires a pressure amount threshold of 40% of the maximum pressure and a time threshold of 2 seconds, the one or more computing devices may determine that the combination is satisfied. If the satisfied combination is associated with an application, the method may proceed to step 911. If the satisfied combination is associated with an operating system, the method may proceed to step 921.

In some embodiments using a combination of a press characteristic-based process and an application-dependent process, the one or more computing devices may both analyze the listing of applications for entries that match the currently active application and the listing of combinations for entries that satisfy the characteristics of the user's current press. The configuration data may further indicate a priority for each entry. Thus, if both a matching application and a satisfied combination is found, the priority will be used to determine if the pressure sensor data is associated with an application or an operating system. For example, assume the satisfied combination is associated with an operating system and is assigned a low priority. Further assume that a matching application is found and is assigned a high priority. Under these assumptions, the one or more computing devices may determine that the pressure sensor data is associated with an application and, therefore, may proceed to step 911. Alternatively, if the satisfied combination was assigned a high priority and the matching application was assigned a low priority, then the one or more computing devices may determine that the pressure sensor data is associated with an operating system and, therefore, may proceed to step 921.

At step 911, the one or more computing devices may, based on the pressure sensor data, determine an application command. This determination may include analyzing configuration data to determine whether the application command is to be transmitted to an application-dependent handler or directly to the application. For example, an application that natively supports pressure-sensitive functionality may be directly sent the pressure sensor data. In such instances, the configuration data may indicate the type of pressure-sensitive functionality natively supported by the application (e.g., DIRECTINK). Based on this indication, the one or more computing devices may determine the application command to include one or more API calls based on the indicated type of pressure-sensitive functionality. Additionally or alternatively, the application command may include the pressure sensor data. The pressure sensor data may be sent in its raw form or may be processed to be in a format associated with the pressure-sensitive functionality (e.g., processed to be within an expected range or processed into one or more expected parameters for the API call). Once determined, the application command may be transmitted to the application. In such instances where the application natively supports pressure-sensitive functionality, the determination of step 911 may be performed completely by the pressure sensor data delegate 730.

Alternatively, an application that supports pressure-sensitive functionality based on an application-dependent handler may not be directly transmitted to the application. In such instances, the configuration data may indicate a socket for communicating with the application-dependent handler. Based on this indication, the one or more computing devices may communicate the pressure sensor data, via the socket, to the application-dependent handler. Additional data, such as data indicating the characteristics of the user's current press, may be transmitted to the application-dependent handler. Upon receipt by the application-dependent handler, the application-dependent handler may determine the application command to include one or more API calls supported by the application. The one or more API calls may be determined based on the pressure sensor data, the characteristics of the user's current press, and/or the configuration data. For example, the application-dependent handler may determine to call an API for changing a font size based on the pressure sensor data exceeding a threshold amount. The one or more API calls may be determined based on comparisons similar to those discussed above in connection with the application-dependent and press characteristic-based processes of step 905. Once determined, the application-dependent handler may transmit the application command to the application. In such instances where the application supports pressure-sensitive functionality based on an application-dependent handler, the determination of step 911 may be performed partially by the pressure sensor data delegate 730 and partially by the application-dependent handler 750.

At step 913, the one or more computing devices may process the application command to perform one or more operations. For example, the one or more API calls included in the application command may be performed. By performing the calls, the application may perform the one or more operations. As discussed throughout this disclosure, some of the types of operations that may be performed by an application include a change to a characteristic of a font (e.g., a font size may be increased) and a change to a characteristic of text (e.g., an option for bolding text may be turned on).

At step 921, the one or more computing devices may, based on the pressure sensor data, determine an operating system command. For example, the one or more computing devices may determine the operating system command to include one or more API calls supported by the application. The one or more API calls may be determined based on the pressure sensor data, the characteristics of the user's current press, and/or the configuration data. For example, the one or more computing devices may determine to call an API for changing a font size based on the pressure sensor data exceeding a threshold amount. The one or more API calls may be determined based on comparisons similar to those discussed above in connection with the application-dependent and press characteristic-based processes of step 905. Additionally, the one or more API calls may be associated with a driver of the operating system. Upon determining the operating system command, the one or more computing devices may transmit the operating system command to the operating system.

At step 923, the one or more computing devices may process the operating system command to perform one or more operations. For example, the one or more API calls included in the operating system command may be performed. By performing the calls, the one or more operations may be performed by the operating system. As discussed throughout this disclosure, some of the types of operations that may be performed by the operating system include a change to an active application (e.g., deactivate a word processing application and activate a drawing application) and an application window minimization (e.g., minimize each application window and show a desktop view of the operating system).

At step 925, one or more computing devices may transmit enterprise resource data that indicates the one or more operations were performed based on the pressure sensor data. The enterprise resource data may indicate the performance of the one or more operations via graphical data, such as a screenshot of a remote desktop or a user interface of an application. For example, if an operation was to bold a font, the graphical data may include a depiction of a user interface that indicates, via an icon, that bolding is active. As another example, if an operation was to increase a font size, the graphical data may include a depiction of a user interface indicating a font size set to 14 (where it was previously set to 10). As yet another example, if an operation was to change the active application, the graphical data may include a depiction of a user interface with a window of the new active application. The form (e.g., full images, partial images, differential images, etc.) of the enterprise resource data and/or time at which the enterprise resource data is transmitted (e.g., according to a periodic schedule) may be based on the manner in which the client agent and the remote access environment are configured to communicate updates.

FIG. 10 illustrates example display screens for comparing operations performed by an enterprise resource or an enterprise service. In particular, an example screen 1000 is depicted for a hosted drawing application that does not support the use of pressure sensor data. In the depiction of screen 1000, a line is shown as having a constant thickness. Since the drawing application associated with screen 1000 does not support the use of pressure sensor data, even if a user applies increased pressure to a pressure sensor, the line thickness will remain constant. Example screen 1050 is depicted for a hosted drawing application that does support the use of pressure sensor data. In the depiction of screen 1050, a line is shown as having a varying thickness. Because the hosted drawing application associated with screen 1050 does support the use of pressure sensor data, the line varies in thickness as the user applies increasing pressure. The example screen 1050 may be one of the displayed generated at step 809 of FIG. 8 and may result from performing the methods of FIGS. 8 and 9.

Figure 11:
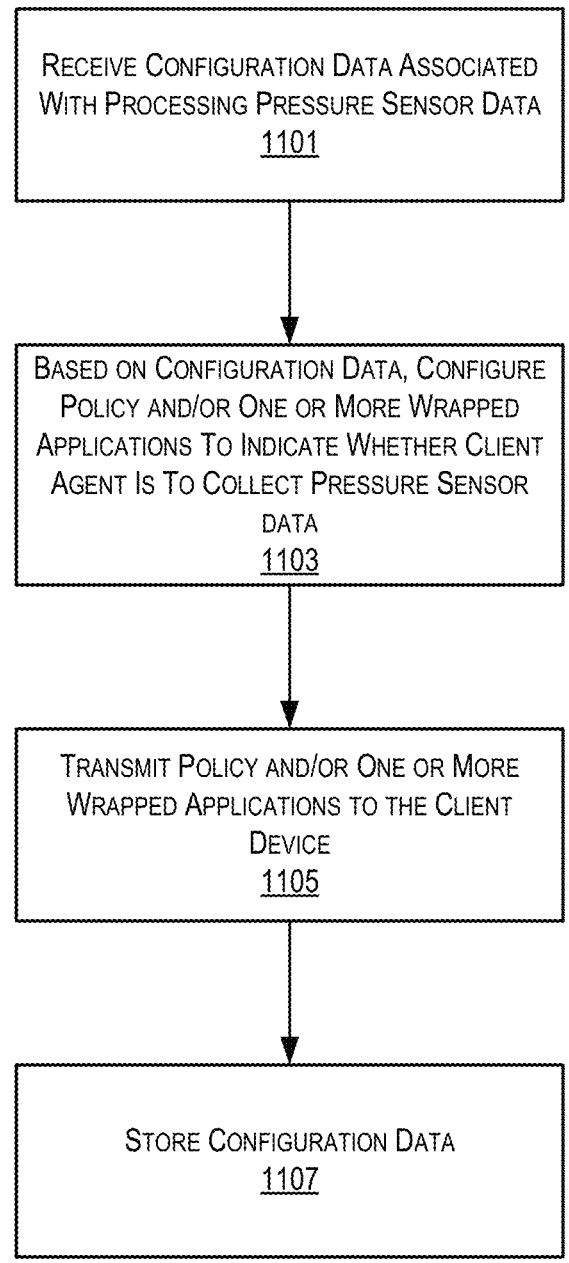
FIG. 11 illustrates an example method for configuring a client device and one or more computing devices of a remote access environment to support the use of pressure sensor data.

Based on the above discussion, a client device may, among other things, be configured to collect pressure sensor data and transmit the pressure sensor data to one or more computing devices of a remote access environment. The one or more computing devices may, among other things, be configured to process the pressure sensor data as part of a process for causing performance of one or more operations. To perform such processes, the client device and the one or more computing devices may require configuration. FIG. 11 illustrates an example method for configuring a client device and one or more computing devices of a remote access environment to support the use of pressure sensor data. The method of FIG. 11 may be performed by the same one or more computing devices that performed the method of FIG. 9. Additionally or alternatively, one or more additional computing devices of the remote access environment may be used to perform the method of FIG. 11. For simplicity, the method of FIG. 11 will be discussed in terms of being performed by one or more computing devices. Additionally, the method of FIG. 11 is for configuring the client device and storing the associated configuration data. In some variations, the enterprise may need to configure any enterprise resources, pressure sensor data delegates, and/or application-dependent handlers needed for processing the pressure sensor data.

At step 1101, one or more computing devices may receive configuration data that is associated with the processing of pressure sensor data. For example, the configuration data may include the listing of applications that are configured within the remote access environment to support pressure-sensitive functionality for the client device and/or the listing of press characteristic combinations. Both of these listings were discussed above in connection with step 905 of FIG. 9. The configuration data may be received in various ways. For example, a user may interact with a web page provided by the enterprise to select which applications will support pressure-sensitive functionality, to assign particular press characteristic combinations to one or more operations, and/or to assign priorities to the various listed applications and combinations. As another example, an operator employed by the enterprise may interact with a user interface to input the desired information for the two listings. Further, the enterprise may have pre-established default listings for when a user first establishes an account with the remote access environment.

At step 1103, the one or more computing devices, based on the configuration data, may configure a policy and/or one or more wrapped applications to indicate whether the client agent is to collect pressure sensor data. For example, the policy described in connection with FIGS. 5 and 6 may be configured to indicate that the client agent is to collect pressure sensor data from the client data. Further, for each entry on the listing of applications, the corresponding wrapped application (e.g., applications 582) may be wrapped to indicate that the client agent is to collect pressure sensor data.

At step 1105, the one or more computing devices may transmit the policy and/or the one or more wrapped applications to the client device. For example, the one or more wrapped applications may be transmitted to the client device based on its availability in an application store (e.g., application store 578). The policy may be transmitted to the client device as part of the processes of the application management framework (e.g., application management framework 614).

At step 1107, the one or more computing devices may store the configuration data. Once stored, the configuration data may be accessed when pressure sensor data is received from the client device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
configuring a handler for an application of a remote access environment, wherein the handler is configured to enable support of pressure-sensitive functionality for the application based on application programming interface (API) calls that are supported by the application;
receiving, by one or more computing devices of the remote access environment, pressure sensor data that indicates an amount of pressure being applied by a user's press on one or more pressure sensors of a client device;
determining, by the one or more computing devices and based on the application being indicated by a listing of applications, that the pressure sensor data is associated with the application, wherein the listing of applications indicates which applications, of the remote access environment, support pressure-sensitive functionality and the listing of applications indicates the application based on the handler being configured for the application;
based on determining that the pressure sensor data is associated with the application:
receiving, by the handler, the pressure sensor data,
determining, by the handler and based on the amount of pressure, one or more API calls that are supported by the application, and
causing the application to perform, based on the one or more API calls, one or more operations; and
transmitting, by the one or more computing devices and to the client device, data indicating that the one or more operations were performed.

2. The method of claim 1, further comprising:
executing each of the application and the handler within a virtual machine of the remote access environment.

3. The method of claim 1, wherein the application does not natively support pressure-sensitive functionality; and
wherein the listing of applications indicates a second application based on the second application natively supporting pressure-sensitive functionality.

4. The method of claim 1, wherein determining that the pressure sensor data is associated with the application is performed based on whether the amount of pressure satisfies an entry on a listing of press characteristic combinations.

5. The method of claim 4, wherein the listing of press characteristic combinations includes a first entry for a combination of a time threshold, a pressure amount threshold, and a press location.

6. The method of claim 1, wherein the data indicating that the one or more operations were performed includes a graphical indication that the one or more operations were performed.

7. The method of claim 1, wherein determining that the pressure sensor data is associated with the application is performed based on:
a determination that the amount of pressure satisfies an entry on a listing of press characteristic combinations, wherein the entry is associated with an operating system of the remote access environment,
a determination of a first priority associated with the listing of applications and of a second priority associated with the listing of press characteristic combinations, and
a determination that the first priority is assigned a higher priority than the second priority.

8. The method of claim 1, wherein the one or more operations include changing a line thickness based on the amount of pressure, and wherein the data indicating that the one or more operations were performed includes graphical data depicting a line that has a first portion of the line thickness.

9. The method of claim 1, wherein determining that the pressure sensor data is associated with the application is performed based on a determination as to whether the application is to be communicated with based on the pressure sensor data or an operating system, of the remote access environment, is to be communicated with based on the pressure sensor data.

10. The method of claim 1, wherein determining that the pressure sensor data is associated with the application further determines that the pressure sensor data is associated with the application instead of the pressure sensor data being associated with an operating system of the remote access environment; and
wherein the steps of receiving, by the handler, the pressure sensor data, determining, by the handler and based on the amount of pressure, the one or more API calls that are supported by the application, and causing the application to perform, based on the one or more API calls, one or more operations are performed as a response to determining that the pressure sensor data is associated with the application instead of the pressure sensor data being associated with an operating system of the remote access environment.

11. A system comprising:
a client device in communication with one or more computing devices of a remote access environment, wherein the client device, based on first executable instructions that are executed by one or more first processors of the client device, is caused to transmit, to the one or more computing devices, pressure sensor data that indicates an amount of pressure being applied by a user's press on one or more pressure sensors of the client device; and
the one or more computing devices, wherein the one or more computing devices, based on second executable instructions being executed at one or more second processors of the one or more computing devices, are caused to:
configure a handler for an application of the remote access environment, wherein the handler is configured to enable support of pressure-sensitive functionality for the application based on application programming interface (API) calls that are supported by the application;
receive, from the client device, the pressure sensor data;
determine, based on the application being indicated by a listing of applications, that the pressure sensor data is associated with the application, wherein the listing of applications indicates which applications, of the remote access environment, support pressure-sensitive functionality and the listing of applications indicates the application based on the handler being configured for the application;
based on determining that the pressure sensor data is associated with the application:
receive, by the handler, the pressure sensor data,
determine, by the handler and based on the amount of pressure, one or more API calls that are supported by the application, and
cause the application to perform, based on the one or more API calls, one or more operations; and
transmit, to the client device, data indicating that the one or more operations were performed.

12. The system of claim 11, wherein the one or more computing devices, based on the second executable instructions being executed at the one or more second processors, are caused to:
execute each of the application and the handler within a virtual machine of the remote access environment.

13. The system of claim 11, wherein the application does not natively support pressure-sensitive functionality; and
wherein the listing of application indicates a second application based on the second application natively supporting pressure-sensitive functionality.

14. The system of claim 11, wherein the one or more computing devices, based on the second executable instructions being executed at one or more second processors, are caused to determine that the pressure sensor data is associated with the application is performed based on whether the amount of pressure satisfies an entry on a listing of press characteristic combinations.

15. The system of claim 14, wherein the listing of press characteristic combinations includes a first entry for a combination of a time threshold, a pressure amount threshold, and a press location.

16. The system of claim 11, wherein the data indicating that the one or more operations were performed includes a graphical indication that the one or more operations were performed.

17. An apparatus comprising:
one or more processors; and
memory storing executable instructions that, when executed by the one or more processors, cause the apparatus to:
configure a handler for an application of a remote access environment, wherein the handler is configured to enable support of pressure-sensitive functionality for the application based on application programming interface (API) calls that are supported by the application;
receive, from a client device, pressure sensor data that indicates an amount of pressure being applied by a user's press on one or more pressure sensors of the client device, wherein the apparatus is associated with the remote access environment;
determine, based on the application being indicated by a listing of application, that the pressure sensor data is associated with the application, wherein the listing of applications indicates which applications, of the remote access environment, support pressure-sensitive functionality and the listing of applications indicates the application based on the handler being configured for the application;
based on determining that the pressure sensor data is associated with the application:
receive, by the handler, the pressure sensor data,
determine, by the handler and based on the amount of pressure, one or more API calls that are supported by the application, and
cause the application to perform, based on the one or more API calls, one or more operations; and
transmit, to the client device, data indicating that the one or more operations were performed.

18. The apparatus of claim 17, wherein the executable instructions, when executed by the one or more processors, cause the apparatus to:
execute each of the application and the handler within a virtual machine of the remote access environment.

19. The apparatus of claim 17, wherein the application does not natively support pressure-sensitive functionality; and
    wherein the listing of applications indicates a second application based on the second application natively supporting pressure-sensitive functionality.

20. The apparatus of claim 17, wherein the executable instructions, when executed by the one or more processors, cause the apparatus to determine that the pressure sensor data is associated with the application based on whether the amount of pressure satisfies an entry on a listing of press characteristic combinations.

21. The apparatus of claim 20, wherein the listing of press characteristic combinations includes a first entry for a combination of a time threshold, a pressure amount threshold, and a press location.

22. The apparatus of claim 17, wherein the executable instructions, when executed by the one or more processors, cause the apparatus to determine that the pressure sensor data is associated with the application based on:
    a determination that the amount of pressure satisfies an entry on a listing of press characteristic combinations, wherein the entry is associated with an operating system of the remote access environment,
    a determination of a first priority associated with the listing of applications and of a second priority associated with the listing of press characteristic combinations, and
    a determination that the first priority is assigned a higher priority than the second priority.

* * * * *